(12) United States Patent
Hayami (10) Patent No.: US 7,433,865 B2
(45) Date of Patent: Oct. 7, 2008

(54) INFORMATION COLLECTION RETRIEVAL SYSTEM

(75) Inventor: Satoshi Hayami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 492 days.

(21) Appl. No.: 10/895,126

(22) Filed: Jul. 21, 2004

(65) Prior Publication Data

US 2005/0033737 A1 Feb. 10, 2005

(30) Foreign Application Priority Data

Aug. 7, 2003 (JP) .............................. 2003-289131

(51) Int. Cl.
*G06F 7/00* (2006.01)
*G01C 21/26* (2006.01)

(52) U.S. Cl. .......................................... 707/3; 701/207

(58) Field of Classification Search ................ 701/207, 701/202; 707/3, 10, 104.1; 705/6; 715/500.1
See application file for complete search history.

(56) References Cited

U.S. PATENT DOCUMENTS

| | | | | |
|---|---|---|---|---|
| 5,940,803 | A | * | 8/1999 | Kanemitsu ..................... 705/6 |
| 6,470,333 | B1 | | 10/2002 | Baclawski |
| 6,829,532 | B2 | * | 12/2004 | Obradovich et al. ........ 701/207 |
| 2002/0126547 | A1 | | 9/2002 | Kato et al. |
| 2003/0061243 | A1 | | 3/2003 | Kim et al. |
| 2003/0093419 | A1 | * | 5/2003 | Bangalore et al. ............... 707/3 |
| 2003/0158655 | A1 | * | 8/2003 | Obradovich et al. ........ 701/207 |
| 2003/0191780 | A1 | * | 10/2003 | Heger et al. ............... 707/104.1 |
| 2005/0039111 | A1 | * | 2/2005 | Abe et al. ................ 715/500.1 |

FOREIGN PATENT DOCUMENTS

| | | |
|---|---|---|
| CN | 1281191 A | 1/2001 |
| CN | 1321277 A | 11/2001 |
| CN | 1417061 | 5/2003 |
| JP | 11-328217 A | 11/1999 |

\* cited by examiner

*Primary Examiner*—Don Wong
*Assistant Examiner*—Hung T Vy
(74) *Attorney, Agent, or Firm*—Sughrue Mion, PLLC

(57) ABSTRACT

An information collection retrieval system includes: a facility information database for storing individual information items about facilities; an information acquisition terminal for inputting a retrieval keyword, and for outputting results of searching the facility information database using the retrieval keyword; an information registration terminal for registering the individual information items about the facilities into the facility information database; and a control unit for controlling the information acquisition terminal, information registration terminal and facility information database. The control unit includes: a registration analyzing section for analyzing registration information transmitted from the information registration terminal, and for storing the analyzed results in the facility information database as the individual information items about the facilities; and a retrieval section for searching the entire facility information database using the retrieval keyword input from the information acquisition terminal, and for transmitting information representing retrieval results to the information acquisition terminal.

10 Claims, 5 Drawing Sheets

| | |
|---|---|
| 20 CHARACTERISTIC IDENTIFYING INFORMATION | [NAME] ××HOME CENTER<br>[TEL] ×××-×××-9999<br>[ADDRESS] YURINOKIDAI, SANDA CITY, HYOGO PREFECTURE<br>[LOCATION] (SPECIFIED BY LATITUDE AND LONGITUDE)<br>[PARKING LOT] UNAVAILABLE<br>[NEAREST STATION] TWO-MINUTE WALK FROM WOODY TOWN CENTRAL STATION, KOBE ELECTRIC RAILWAY CO., LTD. |
| 21 CONTENT INFORMATION | [TYPE]<br>\<head\><br>   \<title\>××HOME CENTER \</title\><br>\</head\><br>\<body bacolor="#FFFFFF"\><br>\<a NAME="top"\>\</a\><br>XX HOME CENTER IS POPULAR FOR GARDENING ASSOCIATED ITEMS, PARTICULARLY FOR VARIETY OF FLOWER POTS. A CAGE-LIKE LARGE ROOF WHICH IS SEEN FROM EAST EXIT OF WOODY TOWN CENTRAL STATION SERVES AS LANDMARK. |
| 22 EXTERNAL DATABASE ID | \</head\><br>[HOME PAGE ADDRESS]<br>http://www.MaruMaru.co.jp |

INFORMATION COLLECTION RETRIEVAL SYSTEM

BACKGROUND OF THE INVENTION

1. Field of the Invention

The present invention relates to an information collection retrieval system for searching for facilities that provide products or services by utilizing the Internet and/or other communication networks.

2. Description of Related Art

An information collection retrieval system has been known conventionally that collects information items from providers of products and/or services by utilizing the Internet, car navigation network and other communication networks, stores them in a database, and provides a user with on-target information required (see Relevant Reference 1, for example).

The information collection retrieval system has a database for storing facility identifying information fed from an information provider terminal and content information including data about facilities, products and/or services in accordance with a specified format as individual information items. When the individual information items are stored in the database, their content information is associated with a basic classification table. The basic classification table is searched according to the individual facilities and products and/or services or combinations of them sent from a consumer terminal. Then applicable individual information items including the facility identifying information satisfying the consumer's request are read from the database to be transmitted to the display unit of the consumer terminal. According to such an information collection retrieval system, since it classifies the same facilities from a variety of viewpoints, it can prevent the omission of them from the retrieval.

Relevant Reference 1: Japanese patent application laid-open No. 11-328217/1999.

The method of classifying the individual information items about the facilities the conventional information collection retrieval system employs cannot carry out classification beyond the number of items of the predetermined classification. Thus, when a very detailed retrieval keyword such as a product name is supplied, it sometimes happens that the applicable classification is absent. In addition, since the classification must be prepared in advance, when a retrieval keyword designating a new product or service is input, it is not unlikely that its applicable classification is not yet prepared.

Furthermore, if a relevant classification of the product or service required by the user is not present, the user must speculate about the classification that is likely to include the product or service. Accordingly, it sometimes happens that the user can acquire only part of many relevant facilities as the retrieval results, or that only part of the many retrieval results includes the facilities meeting the user request, thereby hindering the user from acquiring only the facilities relevant to the user request.

Moreover, to update information registered via an information registration terminal, it is necessary for the information provider to send the information to be registered again. Thus, a problem can occur that the retrieval information is old and different from the present conditions, and even if new products or services are handled, they cannot be hit in the retrieval in some cases.

SUMMARY OF THE INVENTION

The present invention is implemented to solve the foregoing problems. It is therefore an object of the present invention to provide an information collection retrieval system capable of registering a wide variety of facilities, products and/or services using an information registration terminal, and capable of retrieving a wide variety of facilities, products and/or services using an information acquisition terminal.

According to one aspect of the present invention, there is provided an information collection retrieval system including: a facility information database for storing individual information items about facilities; an information acquisition terminal for inputting a retrieval keyword, and for outputting results of searching the facility information database using the retrieval keyword; an information registration terminal for registering the individual information items about the facilities into the facility information database; and a control unit for controlling the information acquisition terminal, the information registration terminal and the facility information database, wherein the control unit includes: a registration analyzing section for analyzing registration information transmitted from the information registration terminal, and for storing analyzed results into the facility information database as one of the individual information items about the facilities; and a retrieval section for searching the facility information database in its entirety using the retrieval keyword input from the information acquisition terminal, and for transmitting information representing retrieval results to the information acquisition terminal.

The information collection retrieval system is configured such that it searches the entire facility information database using the retrieval keyword input from the information acquisition terminal. Thus, it can obviate the need for preparing the classification items in advance, and prevent such conditions as no applicable classification is present or the classification is difficult. In addition, because it is not necessary to prepare the classification in advance, it can also handle retrieval keywords designating new products or services with ease. As a result, it offers an advantage of being able to register a wide variety of facilities, products and/or services using the information registration terminal, and to retrieve a wide variety of facilities, products and/or services using the information acquisition terminal.

DETAILED DESCRIPTION OF THE PREFERRED EMBODIMENT

The embodiment in accordance with the invention will now be described with reference to the accompanying drawings.

Embodiment 1

Figure 1:
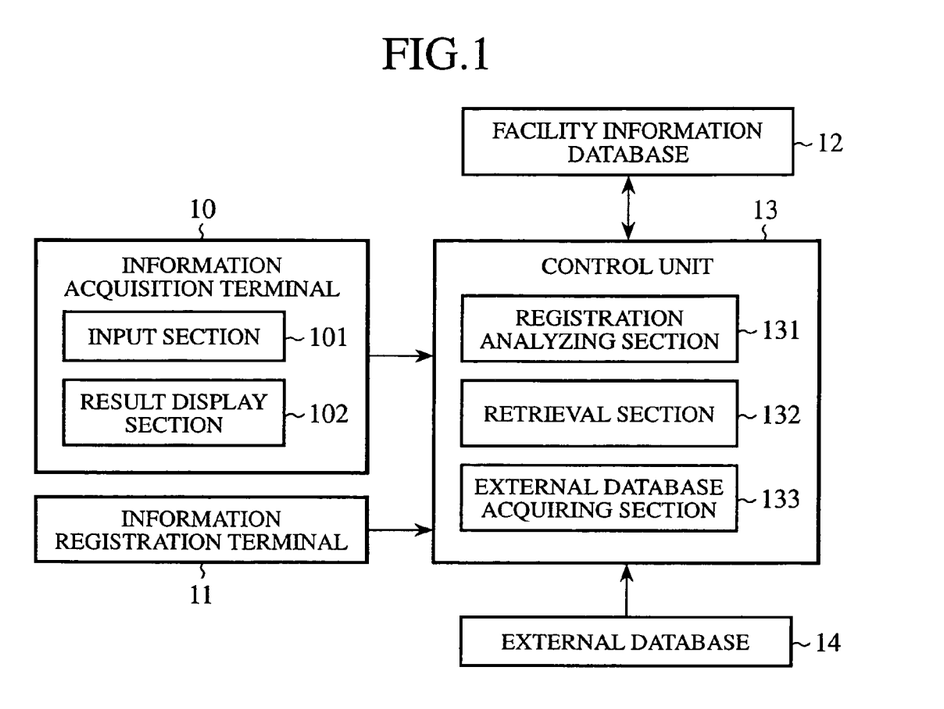
FIG. 1 is a block diagram showing a general configuration of an embodiment 1 of the information collection retrieval system in accordance with the present invention.

FIG. 1 is a block diagram showing a general configuration of an embodiment 1 of the information collection retrieval system in accordance with the present invention. The information collection retrieval system includes an information acquisition terminal 10, an information registration terminal 11, a facility information database 12, a control unit 13 and an external database 14.

The information acquisition terminal 10 is composed of a portable terminal such as a notebook personal computer, PDA (Personal Digital Assistant) or mobile phone, a car navigation terminal, a desktop personal computer, or one of other electronic information terminals. The information acquisition terminal 10 is used by a user to retrieve a desired information item.

The information acquisition terminal 10 includes an input section 101 and a result display section 102. The input section 101 includes a keyboard and a touch panel, for example, and is used to input retrieval conditions. As the retrieval conditions, a retrieval keyword is used which consists of a facility, product and/or service to be retrieved, or a combination of them. The retrieval keyword input from the input section 101 is transmitted to the control unit 13 via a communication channel composed of a radio or wired circuit.

The result display section 102 consists of a liquid-crystal or CRT display unit, for example, and is used to display the retrieval results. The result display section 102 displays the retrieval results transmitted from the control unit 13 via the communication channel consisting of the radio or wired circuit. More specifically, it displays the individual information items about the facilities retrieved using the retrieval keyword.

The information registration terminal 11 is composed of a personal computer, for example, and is used by the information provider to register the individual information items about the facilities into the facility information database 12. The individual information items about the facilities input from the information registration terminal 11 are transmitted to the control unit 13 via the communication channel consisting of the radio or wired circuit.

The facility information database 12 stores the individual information items about the facilities, which are transmitted from the information registration terminal 11 via the control unit 13, according to a specified format. In addition, in response to a retrieval request transmitted from the information acquisition terminal 10 via the control unit 13, the facility information database 12 transmits the individual information items about the applicable facilities to the information acquisition terminal 10 via the control unit 13.

The control unit 13 consists of a server computer, for example, and is installed in a center that operates the information collection retrieval system. The control unit 13 includes a registration analyzing section 131, a retrieval section 132 and an external database (DB) acquiring section 133.

The registration analyzing section 131 analyzes the individual information items about the facilities transmitted from the information registration terminal 11 or the individual information items about the facilities acquired from the external database 14, and classifies them according to the specified formats. The individual information items about the facilities classified by the registration analyzing section 131 are transmitted to the facility information database 12 to be stored.

The retrieval section 132 searches the facility information database 12 using the retrieval keyword transmitted from the information acquisition terminal 10, and retrieves from the facility information database 12 the individual information items about the facilities which include the retrieval keyword in the facilities, products and/or services. The individual information items about the facilities read from the facility information database 12 by the retrieval section 132 are transmitted to the information acquisition terminal 10.

When the individual information items about the facilities registered by the information registration terminal 11 contain an external database ID 22 for making access to the external database 14, the external database acquiring section 133 accesses the external database 14 to acquire the characteristic identifying information and content information of the facilities, the details of which will be described later with reference to FIG. 2. The information associated with the facilities in accordance with the present invention is composed of the characteristic identifying information and content information. The characteristic identifying information and content information of the facilities acquired by the external database acquiring section 133 are registered in the facility information database 12 as part of the individual information items about the facilities.

The external database 14 is a database that is connected to the outside of the information collection retrieval system, to the Internet, for example. The contents of the external database 14 are read by the external database acquiring section 133 of the control unit 13 as described above.

Figure 2:
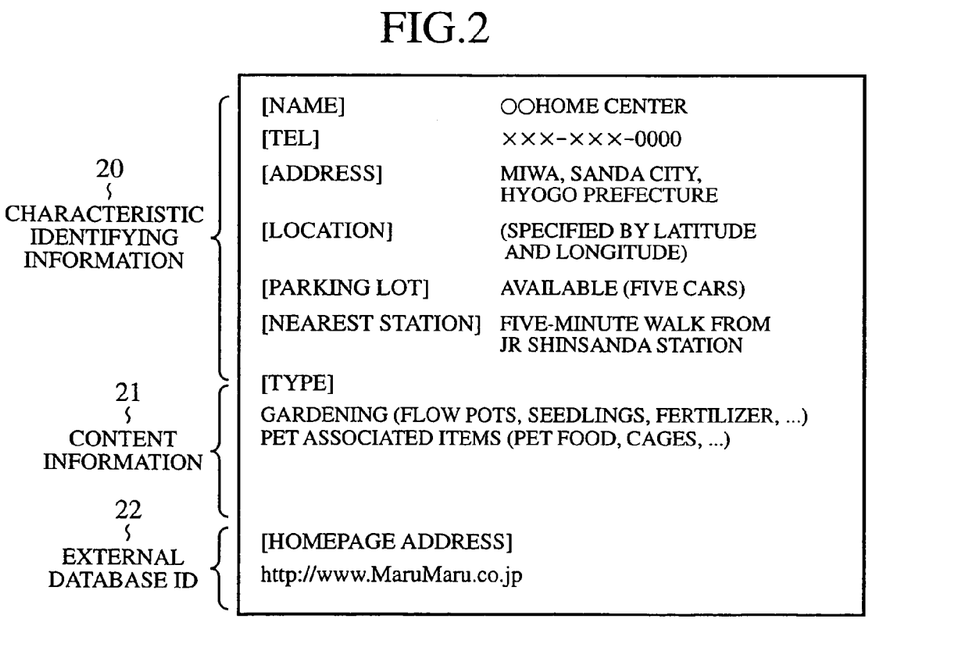
FIG. 2 is a diagram illustrating an example of individual information items about facilities to be registered in a facility information database from an information acquisition terminal in the embodiment 1 of the information collection retrieval system in accordance with the present invention.

FIG. 2 illustrates a format of the individual information items about the facilities to be registered in the facility information database 12. Each of the individual information items about the facilities consists of the characteristic identifying information 20, content information 21 and external database ID 22.

The characteristic identifying information 20 is the information characteristic to the facility, which consists of such information items as the name of the facility, phone number (TEL), address, location (specified by the latitude and longitude), availability of a parking lot and its accommodations, and the nearest station.

The content information 21 includes the type of the facility, and the products and/or services marketed. In the example of FIG. 2, the type of the facility is "gardening", products marketed are "flowerpots", "seedlings", "fertilizers" and so on.

The external database ID 22, which is optional, consists of a home page address on a network such as the Internet, for example. The home page address is used as the identifier of the information item about the facilities stored in the external database 14 of the network. The external database ID 22 can be acquired from the information acquisition terminal 10 as the characteristic identifying information 20. In addition, the external database ID 22 is used to acquire the characteristic identifying information, content information and the like from the external database 14. For example, when the facility to be retrieved is a store, it often has its home page introducing itself. In this case, the information collection retrieval system can extract the individual information items about the facility from the home page by describing its URL (Uniform Resource Locator) in the external database ID 22. Thus, the information collection retrieval system can save some work for registering the individual information items about the facility to the facility information database 12, and acquire the latest detailed content information about the products and/or services.

Figure 3:
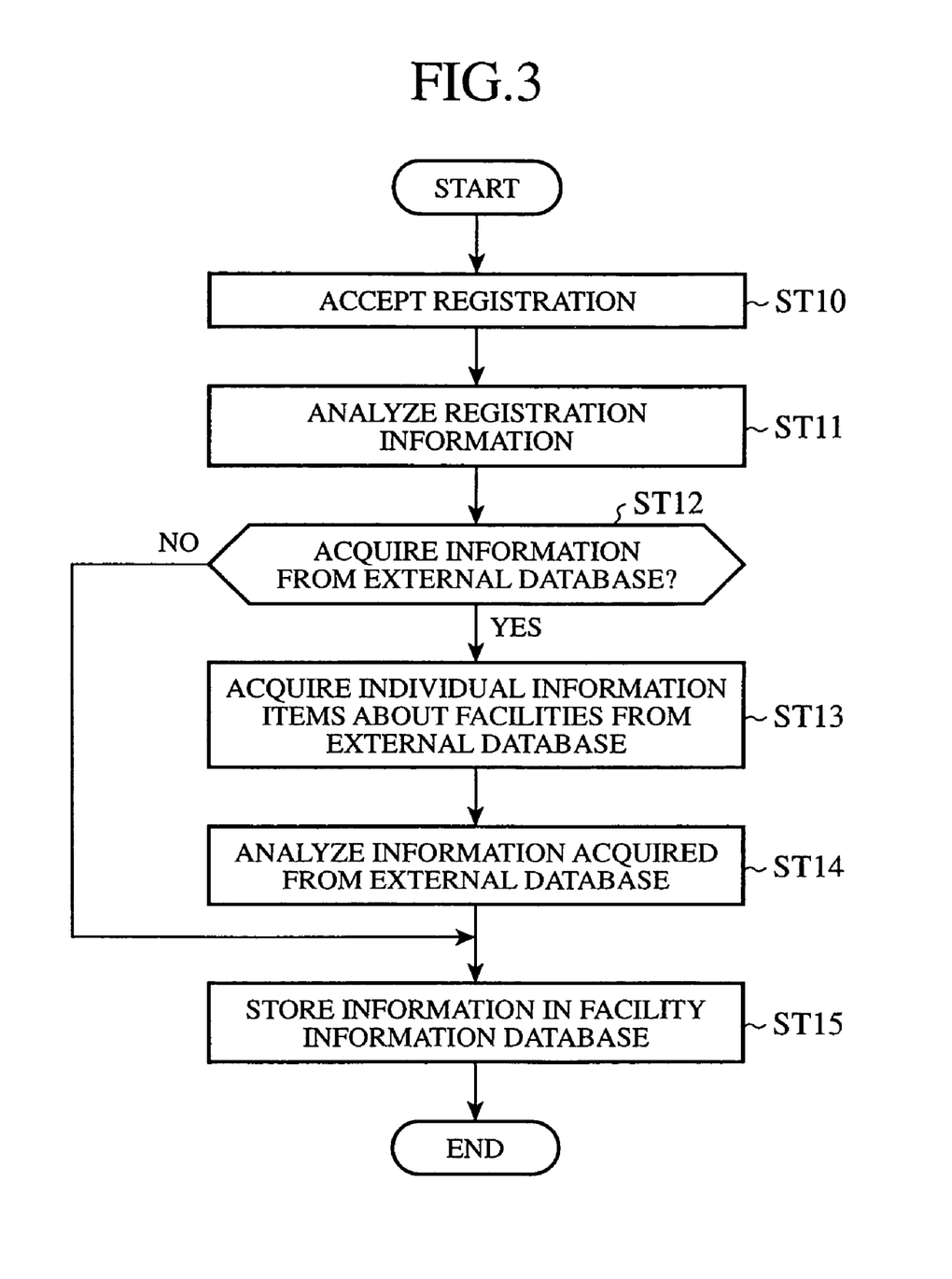
FIG. 3 is a flowchart illustrating the information registration processing performed by the embodiment 1 of the information collection retrieval system in accordance with the present invention.
Figure 4:
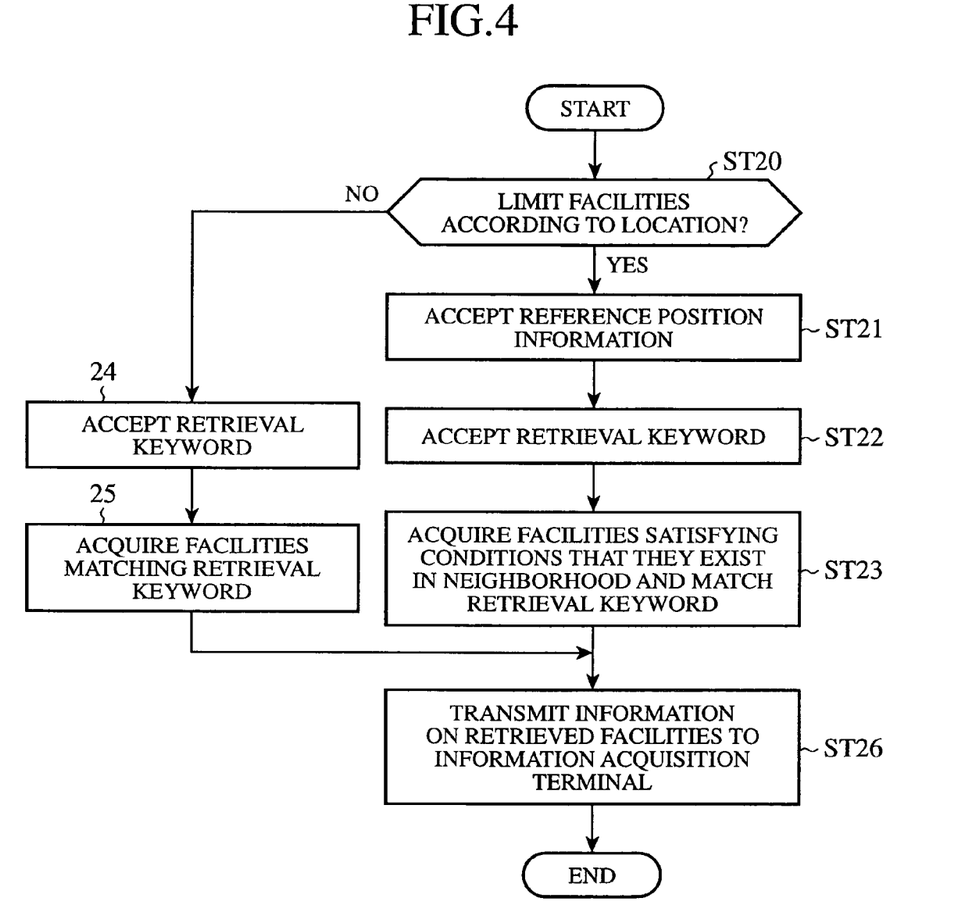
FIG. 4 is a flowchart illustrating the information acquisition processing performed by the embodiment 1 of the information collection retrieval system in accordance with the present invention.

Next, the operation of the embodiment 1 of the information collection retrieval system in accordance with the present invention will be described with reference to the flowcharts of FIGS. 3 and 4 with placing emphasis on the processing of the control unit 13.

First, the information registration processing will be described with reference to the flowchart of FIG. 3. The information registration processing is carried out for registering the individual information items about the facilities to the facility information database 12 in response to the information registration request from the information registration terminal 11.

In the information registration processing, when the information registration request is transmitted from the information registration terminal 11, the processing of accepting the registration is carried out (step ST10). More specifically, the registration analyzing section 131 of the control unit 13 accepts the registration information transmitted from the information registration terminal 11 as the information registration request.

Subsequently, the registration analyzing section 131 analyzes the registration information accepted at step ST10 (step ST11). More specifically, the registration analyzing section 131 acquires the characteristic identifying information and content information from the registration information. In this case, when the registration information includes the external database ID 22, the registration analyzing section 131 acquires it.

Subsequently, the registration analyzing section 131 makes a decision as to whether to acquire information from the external database 14 or not (step ST12). The decision is made by checking whether the registration information transmitted from the information registration terminal 11 includes the external database ID 22 or not.

If the registration analyzing section 131 makes a decision that it should acquire the information from the external database 14 at step ST12, that is, that the registration information includes the external database ID 22, the information including the individual information items about the facility is obtained from the external database 14 (step ST13). More specifically, the external database acquiring section 133 of the control unit 13 makes access to the external database 14 using the external database ID 22, and acquires the information including the individual information items about the facility.

Subsequently, the registration analyzing section 131 analyzes the information acquired from the external database 14 at step ST13 (step ST14). More specifically, the registration analyzing section 131 obtains from the information acquired from the external database 14 the information items such as the name, phone number, address, location (latitude and longitude), and products and/or services of the facility, with classifying them into the characteristic identifying information and content information of the facility. Even if the type of the information cannot be identified as is often the case in the information on the Internet, since the information is likely to include the products and/or services, the registration analyzing section 131 obtains the information stored in the external database 14, and classifies it into the content information.

Incidentally, as for the individual information items about the facilities stored in the facility information database 12 and having the external database ID 22, the external database acquiring section 133 of the control unit 13 can be configured such that it makes access to the external database 14 at regular intervals, and acquires the characteristic identifying information and content information about the facilities by executing the same processing as that of steps ST13 and ST14 to update the contents of the facility information database 12.

For example, when a URL is stored as the external database ID 22, the external database acquiring section 133 extracts the individual information items about the facility from the home page at regular intervals, and updates the contents of the facility information database 12. Thus, it can update the characteristic information and content information of the facility information database 12 following the update of the home page of the facility. Thus, every time the facility updates its home page when it starts marketing new products or services, the facility information database 12 automatically updates its contents to reflect the contents of the home page, thereby always enabling the retrieval of the facility in terms of the new products or services.

When the registration analyzing section 131 makes a decision that it does not acquire information from the external database 14 step ST12, that is, that the registration information does not include the external database ID 22, it skips the processing of steps ST13 and ST14.

Subsequently, the storing processing into the facility information database 12 is performed (step ST15). More specifically, the registration analyzing section 131 of the control unit 13 stores into the facility information database 12 the individual information items about the facility acquired from the information registration terminal 11 at step ST11 and/or the individual information items about the facility acquired from the external database 14 by the external database acquiring section 133 at step ST14.

It is preferable that the storing of the individual information items about the facilities into the facility information database 12 be made with a format enabling high-speed retrieval using the locations (latitude and longitude) of the facilities, facilities and products and/or services, and the like. In addition, as for the content information, it is preferably classified as follows according to the appropriateness for the user requirements: the content information acquired from the information registration terminal 11 (called "first content information" from now on); content information which is acquired from the external database 14 and whose type can be identified (called "second content information" from now on); and content information which is acquired from the external database 14, but whose type cannot be identified, and which includes noise in general as the content information obtained from the Internet (called "third content information" from now on). As for the first to third content information items, although two or three of them match the retrieval keyword, the preceding information item (that is, the first than the second information item, etc.) is considered to have a higher probability of being suitable for the user requirements. To take advantage of the accuracy level of the information, the facility information database 12 can be configured such that it stores the content information with dividing it into the first content information, second content information and third content information. In this case, carrying out the retrieval in the order of the first content information, second content information and third content information can improve the probability of satisfying the user requirements, thereby being able to perform quick retrieval of the facilities.

Next, the information acquisition processing, which acquires the individual information items about the facilities from the facility information database 12 in response to the information acquisition request from the information acquisition terminal 10, will be described with reference to the flowchart illustrated in FIG. 4.

In the present embodiment 1, it is assumed that the information acquisition terminal 10 consists of a mobile terminal such as a portable terminal or car navigation terminal, and that it is possible to set or not to set a limit of the facilities to be retrieved to those in the neighborhood of the information acquisition terminal 10. In this case, the information acquisition terminal 10 transmits to the control unit 13 not only the retrieval keyword, but also its location information as the retrieval reference position information.

In the information acquisition processing, the retrieval section 132 of the control unit 13 makes a decision as to whether the facilities to be retrieved are limited according to the location of the information acquisition terminal 10 or not, first (step ST20). If a decision is made that the facilities to be retrieved are limited at step ST20, the retrieval section 132 of the control unit 13 acquires the retrieval reference position information from the information acquisition terminal 10 (step ST21).

Subsequently, the retrieval section 132 of the control unit 13 accepts the retrieval keyword transmitted from the information acquisition terminal 10 (step ST22). In this case, the retrieval section 132 can be configured such that it accepts a plurality of retrieval keywords in order to enable the retrieval based on the logical AND or logical OR operation of the plurality of retrieval keywords.

Subsequently, the retrieval section 132 retrieves the facilities which satisfy the condition that they exist in the neighborhood of the location designated by the retrieval reference position information acquired from the information acquisition terminal 10, and which match the retrieval keywords input from the information acquisition terminal 10 (step ST23), and transmits the information about the facilities retrieved to the information acquisition terminal 10 (step ST26). In the processing at step ST23, the retrieval section 132 searches the entire content information 21 registered in the facility information database 12 by the information provider, and decides that the facilities including the words corresponding to the retrieval keyword match the retrieval keyword.

For example, consider the facility with the contents as illustrated in FIG. 2, which is registered from the information provider. The facility is considered to be matching the retrieval keyword, when the retrieval is carried out using the retrieval keyword "flower pots", because its content information 21 includes "flower pots". Incidentally, a decision as to whether the facility matches the retrieval keyword is made only according to whether the content information 21 includes the retrieval keyword itself or not. Accordingly, when part of the retrieval keyword "flower pots" input from the information acquisition terminal 10 is written using hiragana, a decision is made that it does not match the retrieval keyword "flower pots" written in kanji in its entirety. As a result, the facility is not selected as the facility matching the retrieval keyword.

Figure 5:
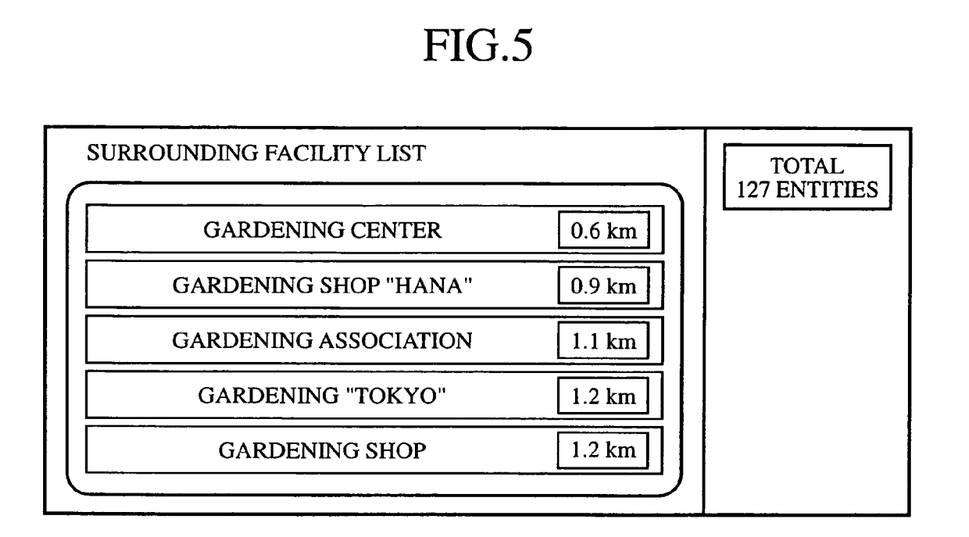
FIG. 5 is a diagram illustrating a display example of retrieval results arranged systematically according to the distances from a reference position to facilities in the embodiment 1 of the information collection retrieval processing in accordance with the present invention.
Figure 6:
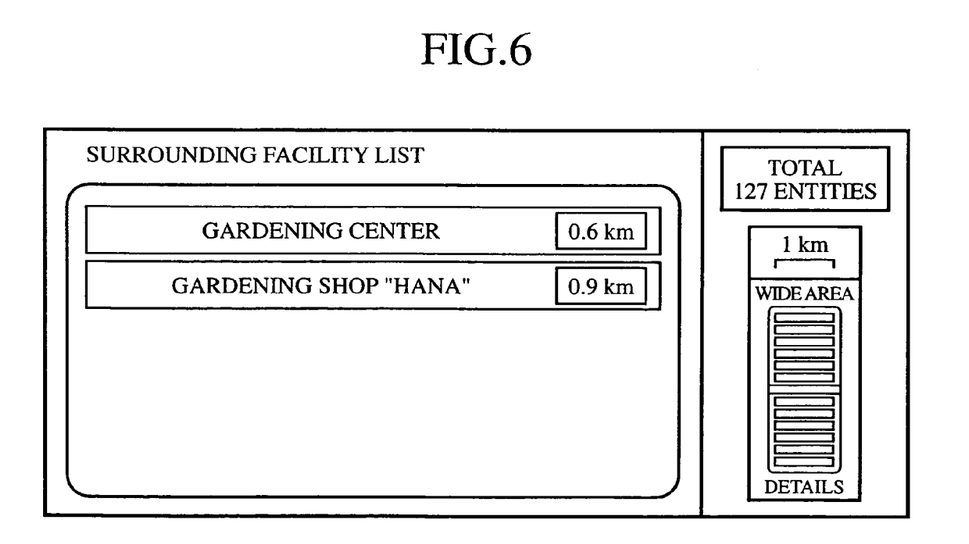
FIG. 6 is a diagram illustrating a display example of the retrieval results of the facilities within the distance of one kilometer from the reference position in the embodiment 1 of the information collection retrieval system in accordance with the present invention.

The processing at step ST23 can offer the handling as illustrated in FIGS. 5 and 6 using the retrieval reference position information. First, as illustrated in FIG. 5, it can arrange the retrieval results in the order of the distance from the reference position to the facility. Second, as illustrated in FIG. 6, it can supply the information acquisition terminal 10 with only the facilities, the locations of which are within the neighborhood of the reference position, as the relevant facilities.

The content information 21 has a difference in the matching level between the retrieval keyword and the facilities and products and/or services depending on the acquisition sources. Therefore when the acquisition source of the content information 21 can be identified, the matching level is determined for each acquisition source so that only the content information 21 acquired from the acquisition sources with the matching level higher than a specified level is subjected to the retrieval, or so that the retrieval results are rearranged in the order of the matching level after the retrieval, to be supplied back to the information acquisition terminal 10.

Figure 7:
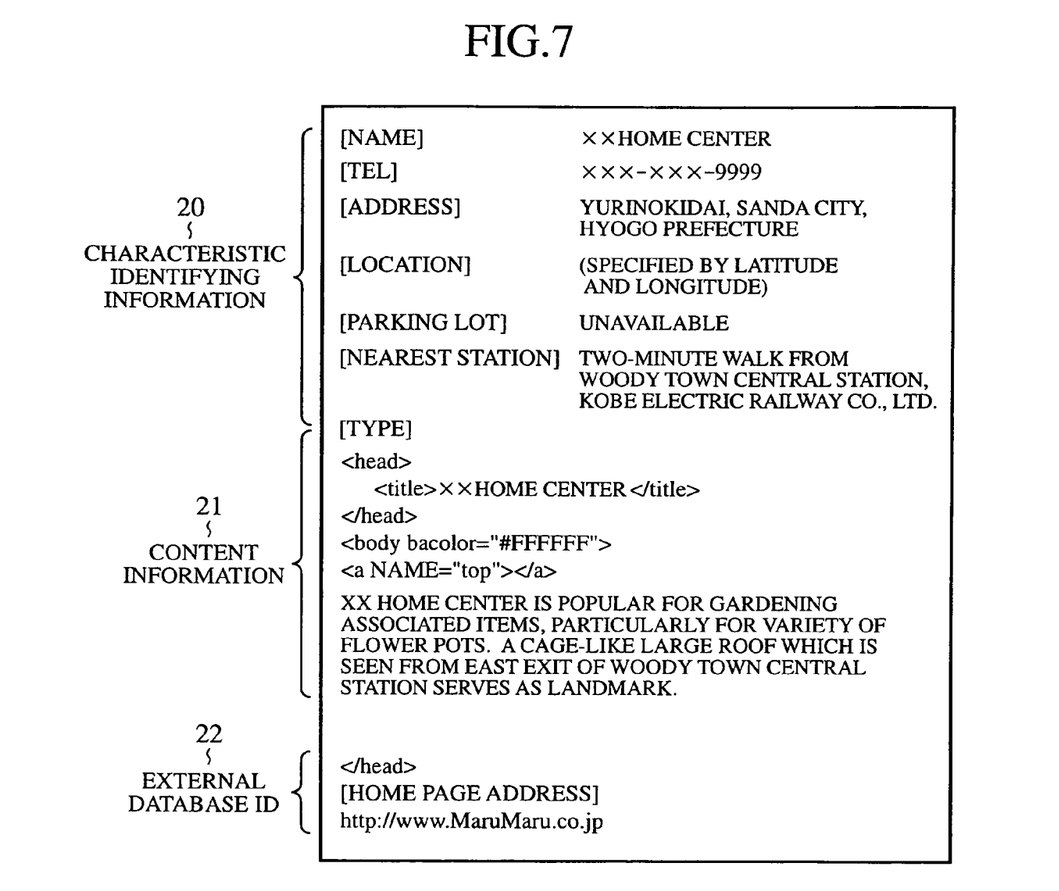
FIG. 7 is a diagram illustrating an example of individual information items about facilities to be registered from an external database to the facility information database in the embodiment 1 of the information collection retrieval system in accordance with the present invention.

For example, consider the facility as illustrated in FIG. 2 whose content information 21 is registered from the information registration terminal 11, and the facility as illustrated in FIG. 7 whose content information 21 is acquired from the external database 14, the Internet. When a decision is made as to whether they include the retrieval keywords "flower pots" and "cage", both the facilities include the two retrieval keywords. However, it is a mistake to makes a decision from the content information 21 as illustrated in FIG. 7 that the facility trades the products and/or services matching the "cages". It is reasonable in this case that facility with the content information 21 as illustrated in FIG. 7 has a lower matching level than the facility with the content information 21 as illustrated in FIG. 2.

If a decision is made that the facilities to be retrieved are not limited at step ST20, the retrieval section 132 of the control unit 13 accepts the retrieval keyword transmitted from the information acquisition terminal 10 (step ST24). In this case, the retrieval section 132 can be configured such that it accepts a plurality of retrieval keywords in order to enable the retrieval in terms of the logical AND or logical OR operation of the plurality of retrieval keywords.

Subsequently, the retrieval section 132 retrieves the facilities which match the retrieval keyword input from the information acquisition terminal 10 (step ST25), and transmits the information about the facilities retrieved to the information acquisition terminal 10 (step ST26). In the processing at step ST25, the retrieval section 132 searches the entire content information 21 registered in the facility information database 12 by the information provider, and the content information including the words corresponding to the retrieval keyword is decided to be the facilities matching the retrieval keyword.

In the processing at step ST25, as in the processing at the foregoing step ST23, when the acquisition source of the content information 21 can be identified, the matching level is determined for each acquisition source so that only the content information 21 acquired from the acquisition sources with the matching level higher than a specified level is subjected to the retrieval, or so that the retrieval results are rearranged in the order of the matching level after the retrieval, to be supplied back to the information acquisition terminal 10.

As described above, the embodiment 1 of the information collection retrieval system in accordance with the present invention is configured such that it searches the facility information database 12 in its entirety using the retrieval keyword input from the information acquisition terminal 10. Consequently, it can obviate the need for preparing the classification items in advance, and can prevent such conditions from occurring in which no applicable classification is present or the classification is difficult. In addition, since it is not necessary to prepare the classification in advance, it can handle such a case quickly as the retrieval keyword designating the new product or service is input. Thus, it enables a wide variety of facilities, products and/or services to be registered and retrieved by using the information registration terminal.

What is claimed is:

1. An information collection retrieval system comprising:
    a facility information database for storing individual information items about facilities;
    an information acquisition terminal for inputting a retrieval keyword, and for outputting results of searching said facility information database using the retrieval keyword;
    an information registration terminal for registering the individual information items about the facilities into said facility information database; and
    a control unit for controlling said information acquisition terminal, said information registration terminal and said facility information database, wherein
    said control unit includes:
        a registration analyzing section for analyzing registration information transmitted from said information registration terminal, and for storing analyzed results into said facility information database as one of the individual information items about the facilities; and
        a retrieval section for searching said facility information database in its entirety using the retrieval keyword input from said information acquisition terminal, and for transmitting information representing retrieval results to said information acquisition terminal;
    wherein said control unit comprises an external database acquiring section for acquiring information associated with the facilities from an external database connected via a network using an external database ID contained in the individual information items about the facilities registered in the facility information database by said information registration terminal, and
    wherein said registration analyzing section analyzes the information associated with the facilities obtained by said external database acquiring section, and stores analyzed results into said facility information database as one of the individual information items about the facilities.

2. The information collection retrieval system according to claim 1, wherein said external database acquiring section makes accesses to said external database at regular intervals, and acquires the information associated with the facilities.

3. The information collection retrieval system according to claim 2, wherein said information acquisition terminal is composed of a portable terminal or a car navigation terminal; and said retrieval section limits information items which are to be retrieved from said facility information database, according to a location of said information acquisition terminal.

4. The information collection retrieval system according to claim 1, wherein said information acquisition terminal is composed of a portable terminal or a car navigation terminal; and said retrieval section limits information items which are to be retrieved from said facility information database, according to a location of said information acquisition terminal.

5. The information collection retrieval system according to claim 1, wherein said information acquisition terminal is composed of a portable terminal or a car navigation terminal; and said retrieval section limits information items which are to be retrieved from said facility information database, according to a location of said information acquisition terminal.

6. The information collection retrieval system according to claim 1, wherein if an individual information item about a facility contains the input retrieval keyword, the facility containing the input retrieval keyword is transmitted to the information acquisition terminal.

7. The information collection retrieval system according to claim 1, wherein the individual information items about the facilities comprise:
    a characteristic identifying information including a name of the facility, a phone number of the facility, and a location of the facility; and
    a content information including a type of the facility and a type of product or service provided by the facility.

8. The information collection retrieval system according to claim 1, wherein the external database ID comprises a home page address of the facility.

9. The information collection retrieval system according to claim 1, wherein the retrieval keyword comprises a plurality of keywords and a logic operation.

10. The information collection retrieval system according to claim 1, wherein the information representing retrieval results is output in an order according to a distance from a reference position.

* * * * *